United States Patent
Vogel

[11] 3,748,573
[45] July 24, 1973

[54] ELECTRICAL LOGGING SYSTEM FOR USE WITH A DRILL STRING

[75] Inventor: Charles B. Vogel, Houston, Tex.

[73] Assignee: Shell Oil Company, New York, N.Y.

[22] Filed: June 21, 1971

[21] Appl. No.: 155,028

[52] U.S. Cl. .................................. 324/10, 324/1
[51] Int. Cl. ..................... G01v 3/06, G01v 3/18
[58] Field of Search .................... 324/1, 10, 6, 5

[56] References Cited
UNITED STATES PATENTS

| | | | |
|---|---|---|---|
| 3,134,069 | 5/1964 | Clements et al. | 324/10 |
| 3,488,574 | 1/1970 | Tanguy | 324/10 X |
| 2,941,784 | 6/1960 | Martin | 324/10 |
| 2,917,704 | 12/1959 | Arps | 324/10 X |
| 2,313,384 | 3/1943 | Lee | 324/10 X |
| 2,018,080 | 10/1935 | Martienssen | 324/5 |

*Primary Examiner*—Gerard R. Strecker
*Attorney*—Theodore E. Bieber et al.

[57] ABSTRACT

An electrical logging system adapted for installation on a drill string for use while drilling. The system includes a specific electrode arrangement that will operate in the vicinity of ferromagnetic drill strings. The electrode arrangement may also be used with more conventional wireline resistivity logging systems.

5 Claims, 3 Drawing Figures

PATENTED JUL 24 1973　　　　3,748,573

C. B. Vogel
INVENTOR

ELECTRICAL LOGGING SYSTEM FOR USE WITH A DRILL STRING

BACKGROUND OF THE INVENTION

The present invention relates to logging devices and more particularly to an instrument assembly for use in electrical resistivity logging. In electrical resistivity logging, it is conventional to provide a source electrode for inducing a current flow in a vertical direction in the earth formations surrounding a borehole and two detecting electrodes for measuring the resistivity of the formation. The detecting electrodes are spaced various distances apart to measure the resistivity over long or short intervals. With these arrangements, the measurements are affected by alterations of the earth in the vicinity of the hole as a result of the drilling process. By using electromagnetic induction, devices have been made which are unaffected by material in the immediate vicinity of the hole, but these employ currents flowing in hroizontal directions, whereas the resistivity for vertical currents is often desired. Moreover, existing devices will not operate satisfactorily when a steel pipe is within the borehole, except by use of fragile toroidal coils.

In addition to the above problems, there is also the problem of installing and operating an electrical logging system in a drill string. Many systems have been designed for telemetering data from the downhole drill string to the surface while drilling but no electrode system has been designed. For example, U.S. Pat. Nos. 3,518,608 and 3,518,609 described telemetering systems wherein a single conductor cable is positioned along the interior of each joint of the drill string and terminating in suitable electrical fittings at the ends of each joint. The electrical fittings automatically complete the circuit when the individual joints are assembled.

While circuits are available for telemetering information to the surface, suitable downhole instrumentation has not been developed. One problem in developing downhole electrical logging instrumentation for installing in a drill string is the interaction of the magnetic field produced by solenoid coil type sensors with the material of the ferromagnetic drill string. This interaction is of sufficient magnitude to substantially mask voltages induced by currents in the earth, preventing successful resistivity logging of the borehole while drilling by induction methods. Also, the high conductivity of the drill string precluded use of conventional electrode systems unless the exterior of the drill string is insulated by rubber or otherwise.

SUMMARY OF THE INVENTION

The present invention solves the above problems by providing a downhole electrical logging instrumentation for installation on a drill string. The instrument includes a pair of source electrodes positioned on drill string to force a current flow in the drill string and a pair of detector electrodes are also positioned on the drill string below the source electrodes. One of the electrodes of each pair is coupled to the remaining portion of the instrument by a conductor positioned on the outer surface of the drll string. The pair of source electrodes are coupled to a power supply capable of supplying in a high frequency, preferable exceeding 10 Kilohertz high amperage signal. This causes the two segments of the drill string between the pairs of electrodes to serve as resistors having a resistance considerably larger than the resistance of the drill string at lower frequencies. The upper pair of electrodes produce a significant voltage drop and effectively create an electric dipole.

While the above description relates to the mounting of the system on a drill string, it is preferable that the electrodes be mounted on the drill collar immediately adjacent to the drill bit. Thus the system will be capable of accurately measuring the resistivity of the formations that are immediately beneath the bit and not yet drilled. When this configuration is used, the current from the dipole formed by the upper pair of electrodes will flow downwardly through the drill bit into the earth. The amount of current flow will, of course, be related directly to the resistivity of the formations below the bit. Thus, the voltage drop across the two lower detector electrodes can be measured and will be related to the reciprocal of the formation resistivity.

BRIEF DESCRIPTION OF THE DRAWINGS

The present invention will be more easily understood from the following detailed description when taken in conjunction with the attached drawings in which.

DESCRIPTION OF PREFERRED EMBODIMENTS

Figure 1:
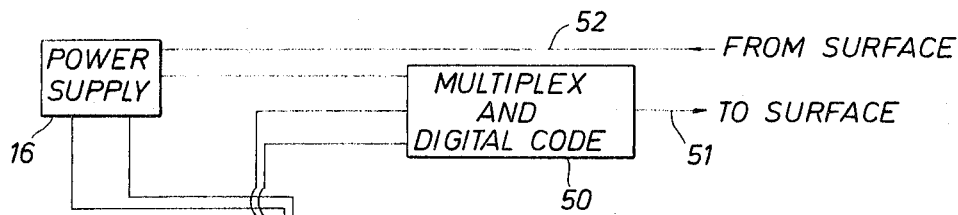
FIG. 1 is a vertical elevation view of the invention applied to a drill string.
Figure 1:
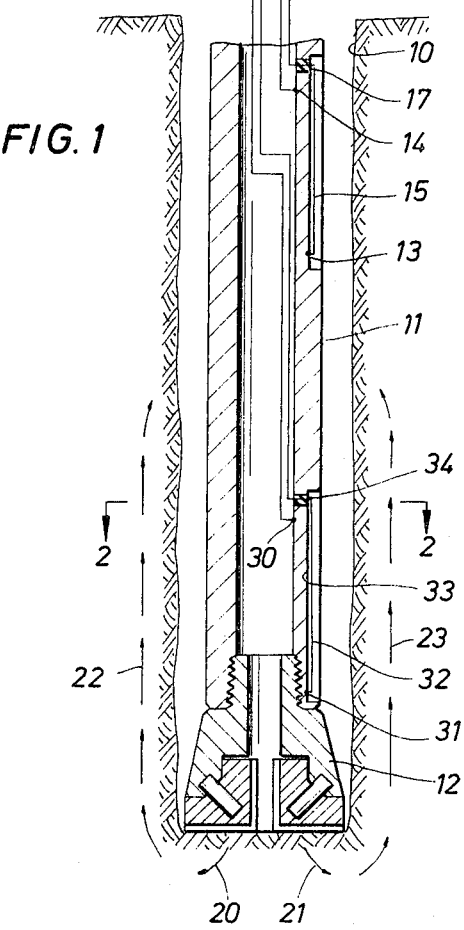
Figure 2:
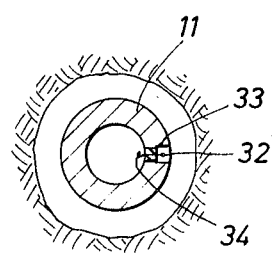
FIG. 2 is a cross-section taken along Line 22, FIG. 1.

Referring to FIGS. 1 and 2, there is shown the electrical logging system of the present invention installed on the lower drill collar of the drill string. The drill collar 11 is shown disposed in a borehole 10 and having a drill bit 12 attached to its lower end. Drill collars, of course, are conventional equipment used in the rotary drilling of oil wells and the like. A first pair of electrodes 13 and 14 are mounted on the upper portion of the drill collar. As shown, the electrode 13 is mounted on the outside of the drill collar and the electrode 14 on the inside although both could be mounted on the inside or the outside. The electrodes should be spaced approximately 24 inches on an 8 inch diameter drill collar. The electrode 14 is shown connected to the power supply 16 by a conductor 15 that is disposed on the outer surface of the drill collar. The conductor must remain on the outer surface of the collar at least for the distance between the two electrodes before the conductor passes through a pressure seal 17 to the interior of the drill collar. The power supply coupled to the electrodes 13 and 14 produces a 30 kHz signal of 30 amperes resulting in a small voltage drop. The power supply is powered by electrical energy transmitted down the borehole by means of the telemetering circuit described in the above-referenced patents. Of course, the power supply 16 is actually disposed in the drill collar 11 either by forming a recess in the drill collar or including the power supply in the form of a package which may be attached to the drill collar and project into the interior thereof.

The pair of electrodes 13 and 14 form an impedance having a value about one thousand times greater than that measured at lower frequencies. This effect is enhanced by an increase in the magnetic properties of the drill collar and since most drill collars are steel, they will have sufficient magnetic properties. The electrical current flows through the collar by way of the pair of electrodes 13 and 14 and produces a significant voltage drop and effectively creates a 60 millivolt dipole of 2 ft. length. The current from the dipole flows through the lower portion of the drill collar and into the earth, returning to the upper portion of the collar and drill string.

A second pair of electrodes, 30 and 31, are positioned to detect the voltage drop in the drill collar. The electrode 30 is positioned on the interior surface of the drill collar while the electrode 31 is mounted below the electrode 30 and on the outer surface of the collar. The two electrodes thus form a pair of electrodes for detecting the voltage drop in the drill collar which, in turn, can be related to the resistivity of the formation. Electrode 31 is coupled by means of a conductor 32 which is disposed on the outer surface of the drill collar at least until it reaches a position where it is above position of the electrode 30 on the interior of the drill collar. The conductor 32 may be positioned on the outer surface of the drill collar or may be placed in a grove 33 formed in the outer surface of the drill collar in order to protect it from mechanical damage. At the top the conductor passes through a pressure seal 34 into the interior of the drill collar. The leads from the electrodes 30 and 31 can then be coupled to a multiplexer and digital encoding system 50. The multiplexer and digital encoding system converts the measured voltage drop to a digital signal which can then be transmitted to surface over a lead 51 which is coupled to the telemetering circuit described in the above patents. The use of a multiplexer circuit is required in order to transmit more than one measurement over the single conductor telemetering system of the above patents.

The positioning of the conductor 32 in the case of the electrodes 30, 31, and the conductor 15 in case of electrodes 13 and 14 on the outer surface of the drill collar, at least until they pass above the location of the other electrodes 30 and 14, positioned on the interior of the drill collar, substantially eliminates the interaction of the magnetic fields of the conductor and the drill collar, which otherwise cause the electrical impedances between the respective pairs of electrodes to be extremely small. The exact reason for this is not fully understood, but actual tests have proven that the above system will operate successfully while a system wherein the conductors from both electrodes are disposed in the interior of the drill collar will not operate. Of course, it is possible to reverse the position of the electrodes shown in FIG. 1 and position the lower electrodes on the inner surface of the drill collar and the upper electrodes on the exterior of the drill collar and still obtain satisfactory results, providing the conductors from the lower electrodes are mounted on the exterior of the drill collar.

Figure 3:
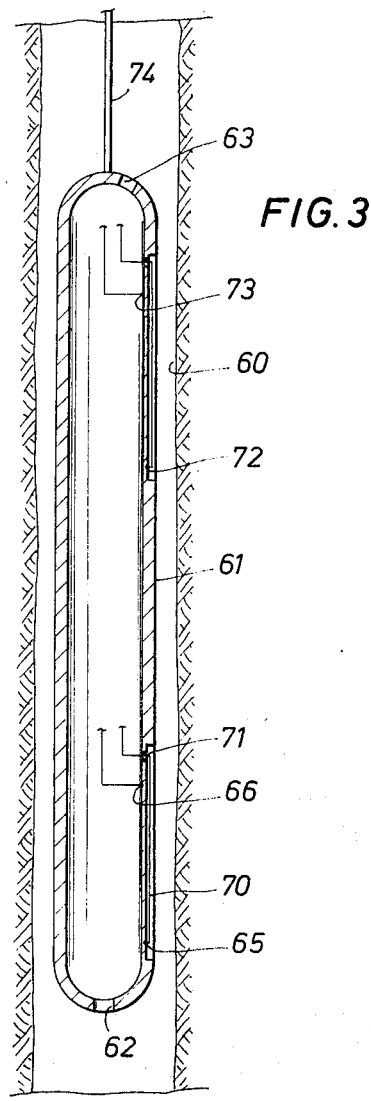
FIG. 3 is a vertical elevation of a logging tool incorporating the invention.

Referring to FIG. 3 there is shown the logging system of the present invention adapted to a conventional electrical logging tool with the logging tool disposed within a borehole 60. The logging tool 61 comprises a hollow elongated cylindrical member 61 having a vent opening 62 at the bottom and a similar vent opening 63 at the top.

The vent openings permit the borehole fluid to circulate freely through the logging tool. The member 61 should be formed of ferromagnetic material for example steel or iron. The tool includes a pair of detector electrodes 65 and 66 with the electrode 65 mounted on the outer surface and electrode 66 on the inner surface. Similarly the lower or outer electrode 65 is coupled by means of a conductor 70 disposed on the outer surface of the tool to the logging instrumentation. The conductor 70 passed up the outer surface of the tool until it is above the location of the inner electrode 66 where it then passes through pressure seal 71. A similar pair of source electrodes 72 and 73 are disposed at the top of the tool for producing a current flow in the formation surrounding the borehole. The logging tool is connected to a logging cable 74 which in addition to furnishing the mechanical support for supporting the tool in the borehole also includes the required electrical circuits for transmitting power to the tool and information signals from the tool to the surface.

The logging tool shown in FIG. 3 operates in the same manner as the drill collar tool shown in FIGS. 1 and 2. The logging tool shown in FIG. 3 has the advantage over previously used electrical logging tools in that the source electrodes will induce a vertical current flow in the formation in place of the circular current flow produced by induction logging tools, but will possess the desirable feature of induction logging tools in that it will cause no current flow in the mud or in the formation immediately adjacent thereto. Thus, the resistivity measurements will be related to resistivity over vertical sections of the formation.

In addition to the above features of this invention, it is also possible to use the resistivity tool as a direction seeking tool. For example, if one is drilling a borehole adjacent to a previously drilled borehole which is cased with a ferromagnetic liner, it is possible to tell the direction of the previously cased borehole from the second borehole. For example, when electrodes 30 and 31 of FIG. 1 are closest to the cased borehole, the resulting signal will have a minimum amplitude. The direction seeking ability of the present resistivity logging tool would be extremely useful where multiple wells are drilled from an offshore platform. In this case, it is necessary to know the direction and approximate distance to the previously drilled wells in order that the well being drilled will bypass the previous wells. Many instances occur wherein a later drilled well intersects or drills through the casing of a previously drilled encased well. When this occurs, it is possible to have serious problems such as blowouts and the like.

We claim as our invention:
1. An electrical logging system comprising:
   an elongated ferromagnetic member disposed to be lowered in a borehole;
   a pair of source electrodes adapted to be connected to a high frequency source of electrical energy, said source electrodes being disposed on the surface of said ferromagnetic member and making electrical contact with said ferromagnetic member;
   a pair of detecting electrodes for detecting a voltage drop in the elongated ferromagnetic member, said pair being disposed on the surface of said ferromagnetic member and making electrical contact with said ferromagnetic member;
   means for coupling said source and detecting electrodes to the surface of said borehole, said means including at least one conductor for each pair of electrodes, each of said at least one conductor being disposed on the outer surface of said ferro- magnetic member for a distance substantially equal to the distance between the pair of electrodes.

2. The system of claim 1 and in addition means for rotating said member.

3. The system of claim 2 wherein said member is a portion of a drill string and one of said detecting electrodes is mounted on the outer surface of the drill string and both of said detecting electrodes are longitudinally spaced below said source electrodes.

4. The system of claim 1 wherein said member comprises a drill collar having a drill bit attached to its lower end, said source electrodes being mounted on the surface of the drill collar above the location of said pair of detector electrodes.

5. The system of claim 4 where said source electrodes are excited by a source of high frequency alternating voltage having a frequency exceeding ten kilohertz.

* * * * *